April 4, 1950 R. H. FASH 2,502,445
METHOD OF AND APPARATUS FOR TREATING LATEX
Filed June 26, 1942 2 Sheets-Sheet 2
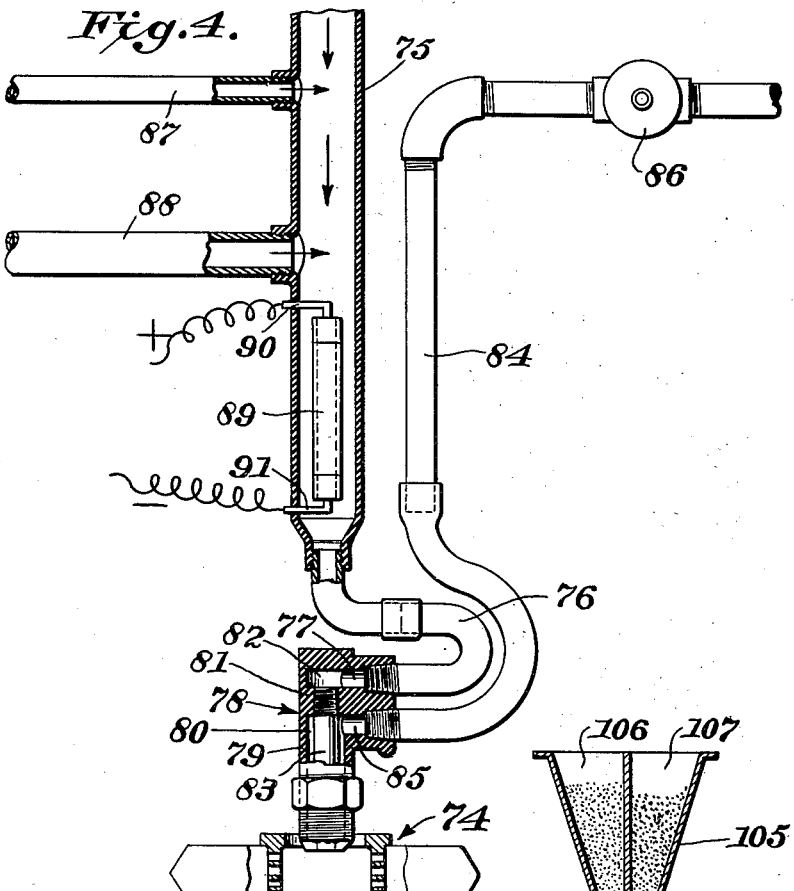
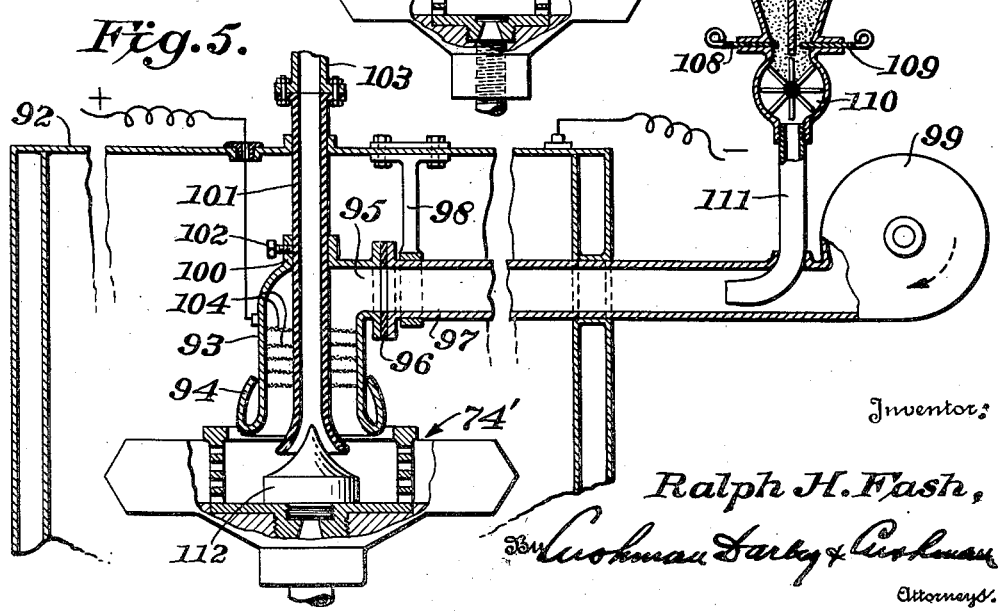
Inventor:
Ralph H. Fash,
By Cushman Darby & Cushman
Attorneys.

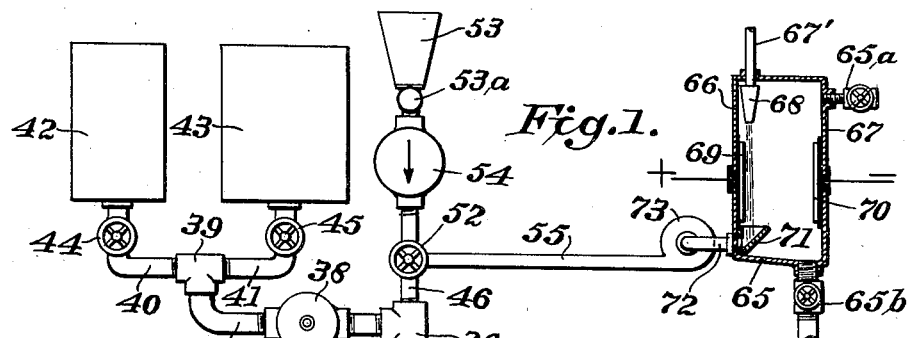
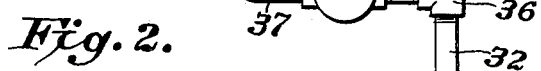
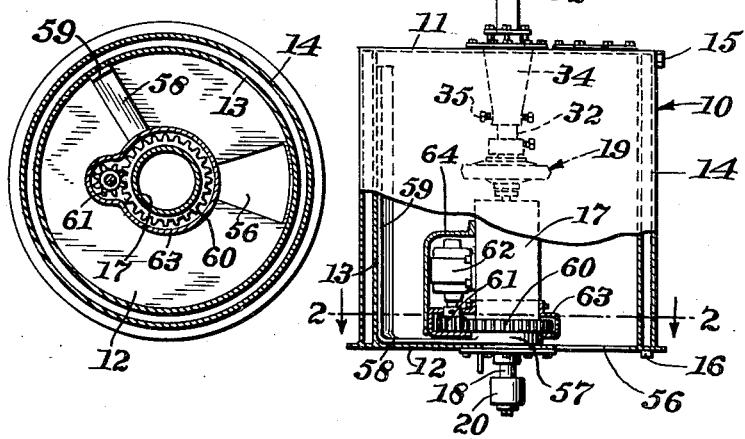
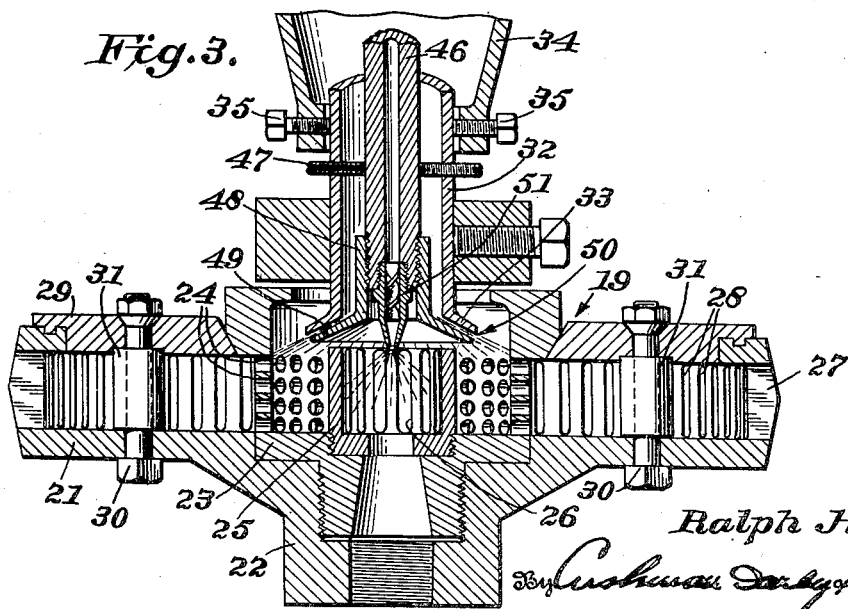

Patented Apr. 4, 1950

2,502,445

UNITED STATES PATENT OFFICE 2,502,445

METHOD OF AND APPARATUS FOR TREATING LATEX

Ralph H. Fash, Fort Worth, Tex., assignor, by mesne assignments, to Anderson, Clayton & Co., Houston, Tex., a corporation of Delaware Application June 26, 1942, Serial No. 448,662

4 Claims. (Cl. 260—821)

This invention relates to method and apparatus for the treatment of latex whereby to produce a superior rubber.

Natural latex, from whatever source derived, is a negatively charged colloidal suspension of hydrocarbons in water which also contains various other substances, such as proteins, resins, and sugar. The present invention is applicable to the treatment of all natural latices, and, also, of such synthetic varieties wherein the rubber is present as a charged colloidal suspension.

In the prior methods of coagulating latex, it has been impossible to effect anything like thorough neutralization of the charges on the rubber particles, and consequently these mutually repellent particles formed capillary openings in the coagulum which persisted and thus prevented the complete fusion of the rubber particles. The object of the present invention is to effect neutralization of the electrical charges on the rubber particles to an extent heretofore impossible, and in this manner to arrive at a product which is superior by reason of the substantial absence of the capillary openings which were heretofore inescapable.

In the smoking method of coagulation which has long been practiced, it has been thought that coagulation is brought about by the increase in temperature and the action of the chemical agents present in the smoke. In my view, however, the major function of the smoke is the electrical neutralization of the rubber particles, this occurring by reason of the fact that some of the smoke particles are oppositely, i. e., positively, charged. While the smoke particles are highly dispersed, those of the latex are not, and consequently no satisfactory contact can be made between the two types of particles. Neutralization of the rubber particles is, thus, far from complete.

Coagulation is most commonly effected by the addition of acid to the latex. The addition of too much acid results in a reversal of the charge on the rubber particles, i. e., the charge is changed from negative to positive. Since the distribution of acid in the latex is non-uniform, the coagulated rubber contains groups of electrically neutral, negatively charged, and positively charged rubber particles. Groups of negatively charged particles and groups of positively charged particles will each act to form the capillary openings above mentioned.

According to the present invention, the latex and the coagulant are intimately mixed together while both are in mist form, i. e., in the form of aerosols, the coagulant acting to neutralize the charges on the rubber particles so that the final product will contain few, if any, charged particles. The ideal condition for coagulation, in accordance with the invention, is to neutralize the electrical charges on the rubber particles in the latex without at the same time causing a reversal of charges or leaving any appreciable amount of negatively charged particles. The nearest approach to this ideal is attained by treating the latex with positively charged particles using my mist-mixing procedure, or with acid, maintaining the pH at the iso-electric point of the rubber, and using mist-mixing. The iso-electric point represents the conditions at which a colloidal suspension will flocculate because the colloidal particles are electrically neutral, and for rubber the pH is between 4 and 5.

Any positively charged particles, solid, liquid, or gaseous, may be used with my mist-mixing procedure to effect the coagulation of the rubber particles in latex. Their effectiveness is dependent upon the charges available on the particles and the uniformity and intimacy of their contact with the rubber particles. Electrical charges can be induced on particles and gases by passing them, for example, through a high-tension electric field of the charge desired to be induced. The extent of the charge is dependent upon the voltage of the field and the nature and surface of the particles. Hence, gases are relatively inefficient for rapidly coagulating large amounts of latex.

Finely powdered sulfur, suspended preferably in an inert gas, can be positively charged and then mixed with the latex by my mist-mixing procedure, resulting in coagulating the rubber and simultaneously coating the electrically neutral rubber particles with sulfur, thus approaching the perfect condition for vulcanization as regards dispersion of the sulfur. The use of colloidal sulfur is preferred because of the greater surface offered and the thinner layer formed on the rubber particles. Colloidal sulfur can be formed by the reaction between hydrogen sulphide and sulfur dioxide and can be obtained already positively charged by mixing the reactants and subjecting the mixture to the action of ultra-violet light.

The rubber industry has determined that the sulfur used in vulcanization actually combines with the rubber hydrocarbon in the proportion of one molecule of the rubber hydrocarbon to two atoms of sulfur, the formula of the resultant compound being $(C_{10}H_{16}S_2)_n$, where $n$ represents an unknown number of molecules combined together to form the actual rubber-sulfur compound. This compound contains 32% sulfur. In actual practice in the manufacture of rubber goods, other than hard rubber, much less than 32% sulfur is used. As one example, 8 pounds of sulfur are used in the mix where softeners are used and only 1.2 pounds used where accelerators replace the softeners. The large difference in the amount of sulfur required without and with accelerators, and the the fact that in both cases the amount of sulfur is much less than that required to combine with the entire amount of rubber affords a basis for a new concept of the mechanism of vulcanization.

Gelatine is brittle, yet when a small amount is dissolved in water a large amount of water can assume a relatively stable form. When the correct amount of a caustic soda solution in water is added to a water solution of a chromic salt, a jelly is formed similar in appearance to that obtained by dissolving gelatine in water. The gel formed from the solution of the chromic salt owes its stability to the chromic oxide formed by the action of the caustic soda on the chromic salt, only a small proportion of the chromic salt being used in the reaction. There are numerous examples of similar jelly formations.

Some gels, especially on aging, crack and the liquid constituent of the gel exudes when possible. This is termed syneresis. Improper methods of gel formation, such as non-uniformity of distribution, will cause syneresis.

It is my opinion, based on a consideration of facts known to the rubber industry, in conjunction with the above facts of jelly formation, that the process of vulcanization is essentially one of jelly formation, the rubber hydrocarbon, as such, acting as the liquid constituent of the jelly and the rubber-sulfur compound corresponding to the gelatine or the chromic oxide in the above examples of jelly formation.

Before submitting the reasoning back of the above statement that vulcanization is essentially gel formation, there are additional ideas which should be presented. When rubber is vulcanized by heating, using softeners, without accelerators, all of the sulfur does not immediately combine with the rubber hydrocarbons even though the vulcanization time is much longer than that used when accelerators are present. Free sulfur is thus present in the final product. On aging at ordinary temperatures, there is a gradual increase in the amount of the combined sulfur indicating that the reaction between the rubber hydrocarbon and sulfur does not require high temperatures.

In the literature, the opinion has been expressed that the individual rubber hydrocarbon particles in latex are composed of a liquid center and an outer polymerized film having a composition identical with that of the center. I agree that there is an apparent film, but I believe the idea that the membrane effect is due to polymerization is incorrect. In my opinion, the apparent membrane is occasioned by the negative electrical charges on the rubber hydrocarbon particles. There is no polymerization of the rubber hydrocarbon in the outer layer of a rubber hydrocarbon particle. The fact that coherent films of rubber are formed in the electro-deposition of rubber from latex where no acid is added is an indication that there is no true membrane surrounding the rubber particles suspended in the latex. A consideration of other apparent membranes where none is actually present will help to an understanding of the subject.

The surface of mercury in a small tube assumes a convex surface and that of water a concave surface. These conditions are stated to be due to surface tension and are occasioned by the free energy on the surface of the liquids. The mercury surface especially seems to have a membrane.

In the literature, the statement is found that the rubber hydrocarbon particles fuse together during acid coagulation. If there were actually a membrane of polymerization rubber hydrocarbon, this could not occur. If the so-called membrane were only a condition due to the electrical charges, the destruction of the electrical charges would permit the particles to unite.

The fact that combination occurs between free sulfur and the rubber hydrocarbon at ordinary temperatures after vulcanization indicates that the delay in the reaction has been due to the lack of contact between the hydrocarbon and the sulfur. The softeners used before accelerators were substituted, facilitated this contact, while accelerators hastened the contact, thereby permitting the use of only one-seventh of the amount of sulfur in the example given above. There are no facts available to indicate that the use of accelerators as now practiced has resulted in using the minimum amount of sulfur. Tests show that the lower the vulcanization coefficient the stronger the rubber and the longer its life.

In the vulcanization of rubber as now practiced, the sulfur and accelerators are mixed with the coagulated rubber, obtained by treating the latex with acid, by passing through heated rolls. When the inadequacy of mixing immiscible liquids is considered as regards uniformity of distribution, the non-uniformity of mixing obtained by mixing a plastic, such as rubber, with sulfur is readily apparent. The present time of vulcanization is measured in fractions of an hour even at the high temperatures employed. This time is required, as I see it, to permit the accelerator to bring the sulfur in contact with the rubber hydrocarbon. If the distribution of sulfur were more uniform and complete, the time, temperature and amount of sulfur required for vulcanization would be materially less. While the use of accelerators may reduce the amount of free sulfur present in rubber after vulcanization, the distribution of the rubber hydrocarbon-sulfur compound will be non-uniform, so that cracking, the equivalent to syneresis, will eventually result. A more uniform and intimate distribution of the sulfur materially increases the strength and life of rubber. The ideal distribution would be to coat each of the rubber particles in latex with a film of sulfur, as by the use of my mist-mixing procedure.

Carbon black, largely used as a filler, has particles already positively charged. In the present-day use of carbon black, it is rolled into the rubber and, hence, has unsatisfactory distribution therein, rendering it impossible to effect thorough neutralization of the rubber particles. My mist-mixing procedure provides a proper dispersion mechanism, enabling effective neutralization of the rubber particles to take place. The carbon black, in its naturally charged condition, and the latex are mist-mixed, or additional charges may be imposed on the carbon black by passing it through an electric field prior to, or during mixing, or both. Since carbon black has desirable properties outside of its capacity for electrical neutralization, it will ordinarily be used, and it and the sulfur can be simultaneously mist-mixed with the latex.

In both gelatine and chromic oxide jellies, the gelatine and chromic oxide consist of electrically charged colloids. Therefore, by analogy, the rubber hydrocarbon-sulfur compound which causes soft vulcanized rubber is probably also electrically charged. When more sulfur is used than is required to form the jelly structure of soft vulcanized rubber, the excess sulfur also combines with the rubber hydrocarbon, gradually thickening the uncombined rubber hydrocarbon until hard rubber is produced. If the minimum amount of sulfur needed to produce a jelly is used, such as occurs when using my mist-mixing procedure of coagulating the latex with electrically charged colloidal sulfur, a low temperature and a short time of heating will be required to vulcanize. The jelly (vulcanized rubber) will have the longest life before cracking (syneresis). By adding electrically charged carbon black with the charged colloidal sulfur the practically complete neutralization of the electrical charges on the rubber particles in the latex will be obtained and at the same time the carbon black will be incorporated in the coagulum so that it will reinforce the jelly (vulcanized rubber) when the rubber mix is heated to vulcanize the rubber (produce the jelly).

Instead of carbon black, other active fillers such as zinc oxide, basic magnesium carbonate, etc., may be used, having charges imposed thereon where necessary. Also compounding ingredients, which act chiefly as diluents, such as chalk, barytes, infusorial earths, etc., finely divided and charged, can be used.

Any liquid containing materials which it is desired to incorporate in the rubber, may be charged and mist-mixed with the latex for the purpose of coagulating the latex and simultaneously uniformly distributing the material in the liquid throughout the resultant coagulum. Liquid vulcanizing agents, such as sulfur monochloride, trinitrobenzene, etc., direct or in solution, may be used in this manner.

Mixtures of any of the materials may be charged and used as above described. Whatever the specific composition of the particles may be, they are used in such amount, carry such charges, and are so dispersed in the latex that substantially all of the rubber particles in the latex will be neutralized. For the best results, the paricles should be of colloidal proportions, being thus best adapted for interaction with the colloidal rubber particles in the latex.

Examples of suitable apparatus for carrying out the invention are shown in the accompanying drawings to which reference will now be made.

In the drawings:

Figure 1 shows a system partly in elevation and partly in section for the dispersion of charged particles in latex in accordance with the invention.

Figure 2 is a section substantially on line 2—2 of Figure 1.

Figure 3 is an enlarged axial section of certain parts which appear in elevation in Fig. 1.

Figure 4 shows, partly in elevation and partly in section, another form of feeding means for the substances, and Figure 5 shows, in vertical section, a still further form of feeding means for the substances.

Referring first to Figs. 1, 2, and 3, reference numeral 10 designates a chamber having top and bottom walls 11 and 12 and a cylindrical wall 13 provided with a jacket 14, the jacket having an inlet 15 and an outlet 16 for a temperature controlling fluid.

Journalled in a housing 17 which rises centrally from the bottom 12, is a vertical shaft 18, which, at its upper end, carries a centrifugal atomizing and mixing head 19, the lower end of the shaft having fixed therein a pulley 20 through which the head may be driven at high speed, for example, 13,000 R. P. M., from any suitable source of power.

As here shown, Fig. 3, the head 19 comprises a circular bottom disc 21 having a central bottom boss 22 in which the upper end of shaft 18 is threaded. The boss 22 has a threaded cavity in which is threaded the stem portion of a basket 23 which has cylindrical side walls provided with a multiplicity of radial openings 24. Threaded in a cavity in the bottom of basket 23 is a basket 25 whose cylindrical side walls, concentric with the side walls of basket 23, are provided with a multiplicity of axially extending slits 26. At its outer periphery, plate 23 has a multiplicity of blades 27 arranged concentrically with the baskets, these blades defining a multiplicity of axially extending slits 28. Reference numeral 29 designates an annular top plate which closes the space between basket 23 and blades 27, being connected to plate 21 by means of bolts 30 and spacers 31.

Projecting through top 11 coaxially with head 19 is a tube 32 which, at its lower end, has an annular flare 33. The tube passes through a stuffing box in the top wall 11, and its lower portion is supported by a yoke 34 provided with a number of radial adjusting and locking screws 35. Above the top 11, tube 32 is threaded into a T 36 into which is connected a pipe 37 which has interposed therein a pump 38. Pipe 37 is connected into a T 39, from which branches 40 and 41 lead to the bottoms of tanks 42 and 43. Shutoff and control valves 44 and 45 are interposed in pipes 40 and 41, respectively.

A pipe 46 extends downwardly through a stuffing box at the top of T 36 and through tube 32, its lower end being adapted to be centered with respect to the tube 32 by means of radial adjusting screws 47. At its lower end tube 46 has threaded thereon a fitting 48 which has a flare 49 cooperating with flare 33 to provide a nozzle adapted to deliver a conical spray. This nozzle, designated generally by the reference numeral 50, is disposed within basket 23 above basket 25 and extends circumferentially outwardly of the latter, so as to deliver into the basket 23. The lower end of pipe 46 has threaded therein a nozzle 51 which is adapted to deliver into the innermost basket 25, the delivery being preferably in the form of a hollow cone.

Above T 36, pipe 46 has interposed therein a three-way valve 52. A hopper 53 is in connection with the inlet of a blower 54 whose outlet is in connection with the top of pipe 46, and a feed regulator 53a, of any desired type, is interposed between the hopper and blower. Valve 52 in one position opens pipe 46 and in its other position connects a pipe 55 into pipe 46 below the valve, cutting off the connection with blower 54. The valve will, for the moment, be assumed to be in the first named position.

Tank 43 is assumed to contain latex, tank 42 being provided in case it should be desired to mix some other liquid with the liquid latex. Ordinarily, it will not be used. Hopper 53, it will be assumed, contains finely powdered sulfur which has been previously positively charged, for example, by subjection to a suitable electric field. Tube 46, nozzle 51, valve 52, hopper 53, regulator 53a, blower 54, and pipe 55, in this case, are preferably of non-conducting material or else their surfaces which would be contacted by the charged sulfur particles are insulated. By opening valve 45 and running pump 38, latex will be delivered into the basket 23 and will emerge through the openings of the latter as a mist or aerosol. Blower 54 being driven, nozzle 51 will deliver the sulfur, suspended in a gas, preferably inert, into the innermost basket 25. The sulfur thus delivered will be more or less in the form of particle clusters which will be broken up into individual particles, i. e., atomized, in passing through the openings of baskets 25 and 23. The latex and the sulfur will emerge in upper and lower mist strata from the openings of basket 23, but these strata will be immediately impinged and beaten together by the spacers 31 and will emerge from the knives 27 as a homogeneous mist mixture. By this time the charges on the sulfur particles have acted to neutralize the charges on the rubber particles. The mist collects on wall 13 and runs down the same to the bottom 12, from which it flows through an opening 56 for collection and separation.

In order to prevent the coagulum from building up on the walls 12 and 13, I may provide a scraper as shown in Figs. 1 and 2. In these figures reference numeral 57 designates a ring journalled on the lower portion of housing 17 and having fixed thereto a scraper comprising a radial arm 58 projecting from the ring and working over plate 12, and a vertical portion 59 working over the inner surface of shell 13. Ring 57 is formed with a surmounting ring gear 60 engaged by a pinion 61 on the shaft of a motor 62 mounted on housing 17, and the wires for the motor may be led thereto through the housing 17. A channel-shaped annular guard 63 fixed to housing 17 encloses gear 60 and pinion 61, and a housing 64 is provided for the motor. In this way these parts are completely protected from the material in the chamber. Portion 58 of the scraper moves the gathered material up to opening 56 on each rotation.

In view of the complete dispersion of the sulfur particles in the latex, the quantity of sulfur used, so far as that necessary for vulcanization is concerned, may be extremely small and considerably less than that necessary in prior commercial practice. The charges on the sulfur should balance those on the rubber and, consequently, if the sulfur alone is relied on for neutralization, it must be highly charged. However, in order to increase the number of positively charged particles, a positively charged filler, preferably carbon black, can be mixed with the sulfur in hopper 53. In this manner both the sulfur and the filler will be simultaneously incorporated in the latex. In view of the small amount of vulcanizing agent necessary, the charging step may be omitted as to it, and the charges on the filler relied on for neutralization of the rubber particles. Also, if it is not desired to add the sulfur at this point, only carbon black or other suitably charged material in particle form can be fed from hopper 53.

By introducing the sulfur into the latex by my mist-mixing procedure, the interspersion of the two will be so thorough that it will not be necessary to use an accelerator. An accelerator may, however, be added, if desired; and in this case, if powdered, may be mixed with the sulfur in hopper 53. Anti-oxidants, and other ingredients, may be similarly added.

In the case of a liquid vulcanizing agent, valve 52 is adjusted to bring pipe 55 into connection with tube 46 and the apparatus shown at the upper right, Fig. 1, is used. Referring to this part of the apparatus, reference numeral 65 designates a tank of rectangular section and having parallel side walls 66 and 67. A pipe 67' for the vulcanizing agent is led through the top wall of the tank to a spray head 68 adapted to deliver a sheet spray parallel to wall 66 downwardly past a positive electrode 69 which, through insulation, is supported by the side wall. Side wall 67 similarly supports a negative electrode 70 opposite electrode 69. Reference numeral 71 designates a trough, preferably of non-conductive material, disposed below nozzle 68 and adapted to catch the spray from the latter after it has passed between the electrodes and closer to the anode so that the particles will be positively charged. The spray should be as fine as possible and the term as here used includes the mist form. A conduit 72 of non-conducting material leads from trough 71 to a blower 73 whose outlet is in connection with pipe 55. The blower is made of non-conductive material, or is so insulated as not to substantially abstract the charges from the spray, and it will be recalled that pipe 55 is of non-conductive material. A valved air inlet is indicated at 65a and a valved drainage outlet for condensate at 65b.

In the operation of this apparatus, the liquid vulcanizing agent is supplied under pressure in regulated amount to nozzle 68, and the spray, after being charged, is delivered by the blower to nozzle 51. The latex is supplied, as before, by nozzle 50, and the two substances are atomized and intimately mixed by head 19 in the manner previously described.

With reference to head 19, it should be mentioned that the basket 25 can be omitted and the nozzles 50 and 51 may be so designed and related that conical sprays delivered thereby will impinge prior to reaching the wall of basket 23. The same atomization and mixing will occur while passing between basket 23 and the periphery of the head. In this connection, reference is made to my co-pending application, Serial No. 438,954, filed April 14, 1942, now Patent No. 2,341,536, granted February 15, 1944, for illustrations of other suitable feeding means for a plurality of substances.

If it is desired to promote vulcanization instantly, a heated fluid may be supplied to the jacket 14. This will not ordinarily be desired, however, and, rather, it will be preferable to inhibit vulcanizing action at this stage. Consequently, wall 13 will ordinarily be unheated, and if necessary, a coolant can be supplied to the jacket to lower the temperature of wall 13 to any desired degree.

Of course, any liquid containing material which it is desired to incorporate in the rubber may be supplied through pipe 67″, with the electrodes charged or uncharged, as required. Also, such liquids can be supplied, if desired, from the tank 42.

Figure 4 shows an apparatus designed for the production and supply of charged colloidal sulfur to the centrifugal head, the head being designated by the reference numeral 74 and being the same as the head 19 of the previous figures, except that the innermost basket is omitted. The head is mounted in a jacketed chamber as before.

Reference numeral 75 designates a tube, preferably of non-conductive material, vertically disposed above head 74, as here shown, although this particular disposition is merely a matter of choice. The lower end of tube 75 is contracted, and by means of a bent tubing section 76 is in connection with a port 77 of a nozzle 78, which is arranged coaxially with head 74. Nozzle 78 has a tubular portion 79 defining a cavity 80 bounded upwardly by a partition wall 81 above which is a chamber 82 in connection with port 77. Threaded in a vertical opening in wall 81 is a tube 83 which is in spaced concentric relation with tubular portion 79 and constitutes an inner nozzle in connection with tube 75. A pipe 84 is in connection with port 85 of body 78, the port communicating with cavity 80. Tubular portion 79 constitutes an outer nozzle for delivery of the latex which is supplied to pipe 84 by means of a pump 86 from a source of supply not shown. Tubing 76 and the nozzle 78 are preferably made of non-conductive material, although pipe 84 may be of ordinary metal.

Pipes 87 and 88 are connected into tube 75 at longitudinally spaced points, and these pipes are either of non-conductive material or are insulated from the ground. Below pipe 88 a mercury arc lamp 89 is disposed concentrically in tube 75 and has leads carried through the wall of the latter, the leads including rod-like conductive portions 90 and 91 set in stuffing boxes in the tube wall and serving to support the lamp.

In the operation of this apparatus, hydrogen sulphide is supplied to the upper end of tube 75 in controlled volume, and sulfur dioxide is supplied in controlled volume through pipe 88. A controlled volume of an inert gas will ordinarily be supplied through pipe 87, although, if desired, an excess of one of the other gases may be used and the inert gas omitted. In any event a reaction, catalyzed by the ultraviolet rays, takes place between the hydrogen sulphide and the sulfur dioxide, so that positively charged colloidal sulfur suspended in the inert gas and/or the excess of one of the other gases, is formed. The charged colloidal sulfur and the latex are delivered by nozzle 78 into the basket of the centrifugal head and are atomized and mixed as before. When it is desired to incorporate a filler, such as carbon black in the rubber, the carbon black, in precharged condition, may be introduced with the inert gas through pipe 87. Of course, any other necessary component can be introduced in the same manner, precharged or not. On the other hand, the carbon black or any other desired ingredient can be introduced through a third nozzle portion of nozzle 78, such a triple nozzle being disclosed in my application above mentioned.

In Figure 5 reference numeral 92 designates a chamber like that shown at 10 in Figure 1, the chamber being similarly provided with scraping means. The head 74' is disposed and mounted exactly as the head 19 of Figure 1 and the head 74 of Figure 4.

Disposed above the head coaxially therewith and with its open end down, is a bell-shaped metal member 93 whose lower edge is bent back, as at 94, to provide a rounded extremity. Bell 93 has a lateral flanged port 95, and through insulation 96 is connected and supported by a conduit 97 which is supported from the top of the chamber 92 by a hanger 98 and extends with a fluid-tight fit through a side opening of the chamber to a blower 99. The bell has at its top end an axial opening defined by a flange 100, and through this opening extends a tube 101 of non-conducting material, the tube extending slidably through a packing in the top wall of chamber 92. The tube can be axially adjusted relative to the bell 93 and maintained in adjusted position by bolts 102 threaded in flange 100. The outer end of tube 101 is connected to a pipe 103 through which latex can be supplied in regulated amount from a source not shown. Fixed in the bell 93 are a number of metal screens 104 which are in good electrical contact with the bell.

Reference numeral 105 designates a hopper, here shown as having two compartments 106 and 107 whose delivery can be controlled or shut off by gates 108 and 109, respectively. Below the gates is a feed wheel 110 which is adapted to feed material from either or both of the hopper compartments into conduit 97 by means of a pipe 111 which has a lower end in the conduit bent away from the blower 99.

The lower end of tube 101 is belled and receives the upper portion of a pointed deflecting boss 112 fixed in the head on the axis thereof.

Bell 93, which is completely insulated from the rest of the apparatus, is in connection with the positive lead from a high voltage source, the negative wire being grounded on the metal chamber, and thence in connection with the metal head 74' through the conductive supporting means for the latter.

Latex supplied to the tube 101 strikes the element 112 by means of which it is deflected as a conical spray to the basket walls for atomization. Assuming hopper 106 to contain finely powdered sulfur and hopper 107 to contain carbon black, either one or both can be admitted in regulated quantity to conduit 97 and, blower 99 being in operation, a cloud of particles is passed to bell 93 and downwardly through the screens 104, which form a part of the anode, so that positive charges will be imposed on the particles in passing through the screens whose mesh can be such as to pass the particles without clogging, the several screens being relied on for the thorough contacting of the particles. The particles thus positively charged, impinge on the spray of latex and during the instantaneous atomizing and mixing action which follows, they act to neutralize the charges on the rubber particles in the latex.

As was stated at the outset, and as is well known, the charges on the rubber particles in latex are negative and consequently I have hereinabove spoken of the interspersion with the latex of positively charged particles. If the latex has been initially treated with sufficient acid to cause a reversal of the charge on the rubber particles, then it would be within the contemplation of the present invention to treat this product with a negatively charged coagulant for the purpose of rendering the rubber particles electrically neutral. It will be further understood that the invention contemplates all variations in procedure and apparatus falling within the scope of the following claims.

I claim:

1. The method of treating latex, which comprises forming an intimate mist mixture of latex and an acid while maintaining the pH substantially at the iso-electric point of the rubber, causing the serum of the latex to re-assume the liquid state and separating the coagulant from the liquid.

2. Apparatus of the class described, comprising a centrifugal atomizing and mixing head, means for feeding to said head a substance having particles which are electrically charged, means for feeding another substance in particle form to said head, said head being adapted to atomize and intimately mix therein the fed substances and centrifugally expel the mist-mixture circumferentially of the head, and means for electrically charging the particles of said other substance oppositely to the first-mentioned particles during feed so that upon atomization and mixing of the substances in said head, said first-mentioned particles will be electrically neutralized.

3. Apparatus of the class described, comprising a centrifugal atomizing and mixing head having a central opening, concentric feed conduits arranged to deliver to said opening, said head being adapted to atomize and intimately mix therein the substances received from said conduits and centrifugally expel the mist-mixture circumferentially of the head, and means for establishing an electrical field in one of said conduits whereby to electrically charge particles fed therethrough.

4. Apparatus of the class described, comprising an electrically conductive centrifugal atomizing and mixing head having an axial inlet opening, a plurality of concentrical tubular means opposite said opening, one of said tubular means being electrically conductive, means for separately feeding a plurality of substances in regulated proportions to said tubular means for delivery to said head, said head being adapted to atomize and intimately mix therein the substances received from said tubular means and centrifugally expel the mist mixture circumferentially of the head, and means for leading one side of a high voltage source to said head and the other side to said conductive tubular means whereby to establish a field through which one of the fed substances passes.

RALPH H. FASH.

REFERENCES CITED

The following references are of record in the file of this patent:

UNITED STATES PATENTS

| Number | Name | Date |
|---|---|---|
| 850,965 | Ranson | Apr. 28, 1907 |
| 1,338,352 | Bloom | Apr. 27, 1920 |
| 1,423,525 | Hopkinson | July 25, 1922 |
| 1,428,526 | Bradley | Sept. 12, 1922 |
| 1,492,027 | Gardner | Apr. 29, 1924 |
| 1,546,922 | Faber | July 21, 1925 |
| 1,611,278 | Peterson | Dec. 21, 1926 |
| 1,622,474 | Sveen | Mar. 29, 1927 |
| 2,002,252 | Stam | May 21, 1935 |
| 2,043,217 | Yaglon | June 2, 1936 |
| 2,047,525 | Thode | July 14, 1936 |
| 2,123,482 | deJong | July 12, 1938 |
| 2,249,205 | Hansen | July 15, 1941 |
| 2,270,341 | Ransburg | Jan. 20, 1942 |
| 2,280,802 | Depends | Apr. 28, 1942 |
| 2,302,289 | Cook | Nov. 17, 1942 |
| 2,341,536 | Fash | Feb. 15, 1944 |

FOREIGN PATENTS

| Number | Country | Date |
|---|---|---|
| 16,096 | Great Britain | 1914 |

OTHER REFERENCES

Mellor's Treatise on Inorganic and Theoretical Chemistry, vol. 8, pp. 134, 135, 203 and 204.